United States Patent
Lee

(10) Patent No.: US 9,844,004 B2
(45) Date of Patent: Dec. 12, 2017

(54) TELEMATICS TERMINAL, TELEMATICS CENTER AND CONTROL METHOD THEREOF

(71) Applicant: HYUNDAI MOTOR COMPANY, Seoul (KR)

(72) Inventor: Woo Cheul Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 210 days.

(21) Appl. No.: 14/704,874

(22) Filed: May 5, 2015

(65) Prior Publication Data

US 2016/0150482 A1 May 26, 2016

(30) Foreign Application Priority Data

Nov. 21, 2014 (KR) .................. 10-2014-0163184

(51) Int. Cl.
*H04W 52/02* (2009.01)
*H04W 48/16* (2009.01)

(52) U.S. Cl.
CPC ..... *H04W 52/0258* (2013.01); *H04W 52/028* (2013.01); *H04W 52/0212* (2013.01); *H04W 48/16* (2013.01); *Y02B 60/50* (2013.01)

(58) Field of Classification Search
CPC .......... H04W 52/0258; H04W 52/028; H04W 52/0212; H04W 52/0219; H04W 52/0235;

(Continued)

(56) References Cited

U.S. PATENT DOCUMENTS

2002/0102974 A1* 8/2002 Raith .................... H04M 1/725
455/434
2009/0298437 A1* 12/2009 Hoefel ................ H04W 48/16
455/67.11

(Continued)

FOREIGN PATENT DOCUMENTS

JP 2005-181241 A 7/2005
KR 2010-0026920 A 3/2010

(Continued)

OTHER PUBLICATIONS

Ordman, Efficient over-the-air software and Firmware updates for the Internet of Things, Apr. 10, 2014, Embedded Computing Design, http://embedded-computing.com/articles/efficient-software-firmware-updates-the-internet-things/, 5 pages.*

Primary Examiner — Hoon J Chung
(74) Attorney, Agent, or Firm — McDermott Will & Emery LLP

(57) ABSTRACT

A telematics center includes a modem unit configured to receive at least one piece of vehicle information from at least one telematics terminal and a controller configured to analyze an operation pattern relating to a modem mounted in each of the at least one telematics terminal based on the at least one received piece of vehicle information and to determine an Out Of Service (OOS) scan mode based on the analyzed operation pattern relating to the modem. The controller is configured to transmit setting information corresponding to the determined scan mode to each of the at least one telematics terminal. Thereby, improvement in user convenience and apparatus efficiency is expected.

12 Claims, 5 Drawing Sheets

(58) Field of Classification Search
CPC .. H04W 52/285; H04W 52/288; H04W 68/04
See application file for complete search history.

(56) References Cited

U.S. PATENT DOCUMENTS

| | | | | |
|---|---|---|---|---|
| 2013/0344902 | A1* | 12/2013 | Cili | H04W 64/006 455/456.6 |
| 2014/0164579 | A1* | 6/2014 | Douthitt | G07C 5/008 709/219 |
| 2014/0194086 | A1* | 7/2014 | Alam | H04W 52/0254 455/405 |
| 2017/0013559 | A1* | 1/2017 | Sumitomo | H04W 52/0254 |

FOREIGN PATENT DOCUMENTS

| | | |
|---|---|---|
| KR | 10-2010-0063474 A | 6/2010 |
| KR | 10-1007739 B1 | 1/2011 |
| KR | 10-1047793 B1 | 7/2011 |
| KR | 10-1235970 B1 | 2/2013 |
| KR | 10-1373134 B1 | 3/2014 |
| KR | 10-1384957 B1 | 4/2014 |
| WO | 2004/102927 A2 | 11/2004 |
| WO | 2010/141936 A1 | 12/2010 |

\* cited by examiner

TELEMATICS TERMINAL, TELEMATICS CENTER AND CONTROL METHOD THEREOF

CROSS-REFERENCE TO RELATED APPLICATION

This application claims the benefit of Korean Patent Application No. 10-2014-0163184, filed on Nov. 21, 2014 with Korean Intellectual Property Office, the disclosure of which is hereby incorporated by reference as if fully set forth herein.

BACKGROUND OF THE INVENTION

Field of the Invention

The present invention relates to a telematics terminal, a telematics center and a control method thereof, and more particularly, to a telematics terminal, a telematics center and a control method thereof in which an Out Of Service (OOS) scan mode of the telematics terminal is changed into a user-customized type.

Discussion of the Related Art

According to advances in electronic control technology, various devices of vehicles, which were conventionally operated through mechanical methods, are now operated by electrical methods for reasons of driver convenience and driving safety, and vehicle systems gradually become more sophisticated and advanced. Thereamong, telematics technology is being developed now.

In general, telematics is a wireless data service for providing information during movement of transport units and, thereby, information may be transmitted and received to and from computers installed in transportation equipment, such as vehicles, aircrafts, and ships, through wireless communication technology, GPSs, and technology for exchanging text and voice signals over the Internet. Telematics is a compound word of telecommunication and informatics and refers to a system configured to analyze various phenomena occurring in a vehicle and to collect various pieces of information necessary for driving through a communication terminal mounted in the vehicle so as to facilitate convenient and safe driving.

Further, in order to receive the telematics service, a telematics terminal having a function of performing mobile communication with a global positioning system (GPS) needs to be mounted in a vehicle. The telematics service applies mobile communication technology and location technology to vehicles and thus provides information regarding vehicle accidents, theft sensing and driving path guidance, traffic and living information, games, and the like to drivers.

If a vehicle breaks down, the telematics terminal of the vehicle enters a sleep mode in which the telematics terminal is driven at low power. In more detail, in the sleep mode, the telematics terminal periodically receives a reception signal (Rx signal) alone. However, when the telematics terminal is disposed in a weak electric field or a shadow zone in which wireless communication is difficult, the telematics terminal not only receives the Rx signal but also transmits a transmission signal (Tx signal) to the outside.

Conventionally, if the telematics service is out of service, in order to be changed into in service, a telematics terminal performs an Out Of Service (OOS) scan.

When the OOS scan is performed, an OOS scan method in consideration of a usage pattern of the telematics terminal is required.

SUMMARY OF THE INVENTION

Accordingly, the present invention is directed to a telematics terminal, a telematics center and a control method thereof that substantially obviate one or more problems due to limitations and disadvantages of the related art.

An object of the present invention is to provide a telematics center and a control method thereof in which vehicle information is collected from a plurality of telematics terminals and the OOS scan mode of each telematics terminal is changed into a user-customized type.

Another object of the present invention is to provide a telematics center and a control method thereof in which operation of a modem mounted in a telematics terminal is controlled so that electrical discharge of a vehicle may be prevented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a telematics center includes a modem unit configured to receive at least one piece of vehicle information from at least one telematics terminal and a controller configured to analyze an operation pattern relating to a modem mounted in each of the at least one telematics terminal based on the at least one received piece of vehicle information and to determine an Out Of Service (OOS) scan mode based on the analyzed operation pattern relating to the modem. The controller is configured to transmit setting information corresponding to the determined scan mode to each of the at least one telematics terminal through the modem unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
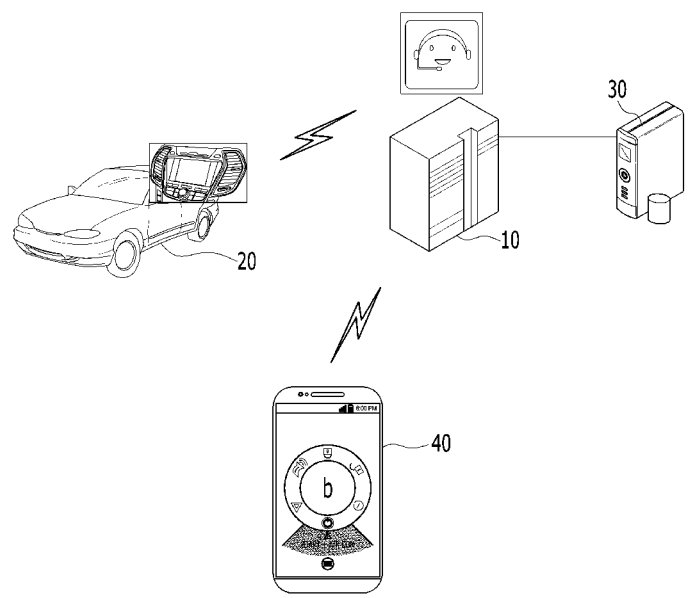
FIG. 1 is a schematic view of a telematics system in accordance with one embodiment of the present invention.

Reference will now be made in detail to the preferred embodiments of the present invention, examples of which are illustrated in the accompanying drawings. In the drawings, the same or similar elements are denoted by the same reference numerals even though they are depicted in different drawings, and a detailed description thereof will be omitted. The suffixes "module" and "unit" in elements used in the description below are given or used together only in consideration of ease in preparation of the specification and do not have distinctive meanings or functions. In the following description of embodiments of the present invention, a detailed description of known functions and configurations incorporated herein will be omitted when it may make the subject matter of the present invention rather unclear.

Further, in description of elements of the present invention, the terms "first", "second", etc. may be used. These terms are used only to discriminate one element from other elements, and the nature, order, or sequence of the corresponding element is not limited by these terms.

If it is stated that an element is "connected to", "combined with", or "coupled with" another element, it will be understood that the former may be directly connected to or combined with the latter or other elements may be interposed between the two elements. On the other hand, if it is stated that an element is "connected directly to", "combined directly with", or "coupled directly with" another element, it will be understood that other elements are not interposed between the two elements.

A singular expression may include a plural expression unless they have different meanings in the context.

In the following description of the present invention, it will be understood that the terms "including" and "having" mean presence of features, numbers, stages, operations, elements, parts, or combinations thereof stated in the specification or combinations thereof and does not exclude presence of one or more other features, numbers, stages, operations, elements, parts, or combinations thereof.

FIG. 1 is a schematic view of a telematics system in accordance with one embodiment of the present invention.

With reference to FIG. 1, a telematics system 1 may include a telematics center 10, a database 30 storing data of the telematics center 10, a telematics terminal 20 which may be installed in a vehicle, and a mobile terminal 40 which may remote control the telematics terminal 20.

The telematics center 10 may provide various services to the telematics terminal 20. The telematics center 10 provides information regarding vehicle accidents, theft sensing, driving path guidance, traffic and living information, games, and the like to the telematics terminal 20.

Further, the telematics center 10 may communicate with the mobile terminal 40. The mobile terminal 40 may execute an application for communication with the telematics center 10 and transmit a remote control command indicating remote start, remote vehicle air-conditioning, or remote door lock/unlock to the telematics terminal 20.

The telematics center 10 may store information regarding the telematics terminal 20 in the database 30. The database 30 may perform the function of big data.

The telematics center 10 may receive information regarding a vehicle in which the telematics terminal 20 is mounted from the telematics terminal 20 through mobile communication. The telematics center 10 may receive general vehicle information from the telematics terminal 20. For example, the telematics terminal 20 may transmit vehicle driving information including the driving velocity and distance of the vehicle, vehicle driver information, vehicle communication state information, remaining battery capacity information and the like to the telematics center 10. In addition to the above-described pieces of information, the telematics center 10 may receive other various pieces of information from the telematics center 20.

The telematics center 10 may receive information regarding a modem of the telematics terminal 20. For example, the telematics center 100 may receive information, such as a remote service usage frequency, battery capacity/performance information, a weak electric field area visit frequency, a weak electric field area visit time/pattern, and a parking time, from the telematics terminal 20.

The telematics center 10 may receive the above-described various pieces of vehicle information, and provide information proper to the telematics terminal 20 or change a set value in the telematics terminal 20.

In such a manner, the telematics center 10 may provide various customized services to the telematics terminal 20.

The telematics center 10 may provide different services to a plurality of telematics terminals 20. In more detail, the telematics center 10 may control the telematics terminals 20 so as to perform an Out Of Service (OOS) scan at different periods. The OOS scan means a scan in which, if a telematics terminal 20 does not receive the telematics service, the telematics terminal 20 is connected to a network so as to receive the service.

The telematics center 10 may receive vehicle information including modem-related information from the respective telematics terminals 20, analyze operation patterns of the telematics terminals 20, and control the telematics terminals 20 so as to perform the OOS scan suitably.

In this case, the telematics center 10 may set OOS scan modes suitable for the respective telematics terminals 20 and provide the set OOS scan modes, thus improving user convenience. Further, the telematics center 10 may allow modems of the telematics terminals 20 to more effectively use power consumed to perform the OOS scan and thus, unnecessary electrical discharge of a vehicle battery due to the modem of the telematics terminal 20 may be prevented.

Figure 2:
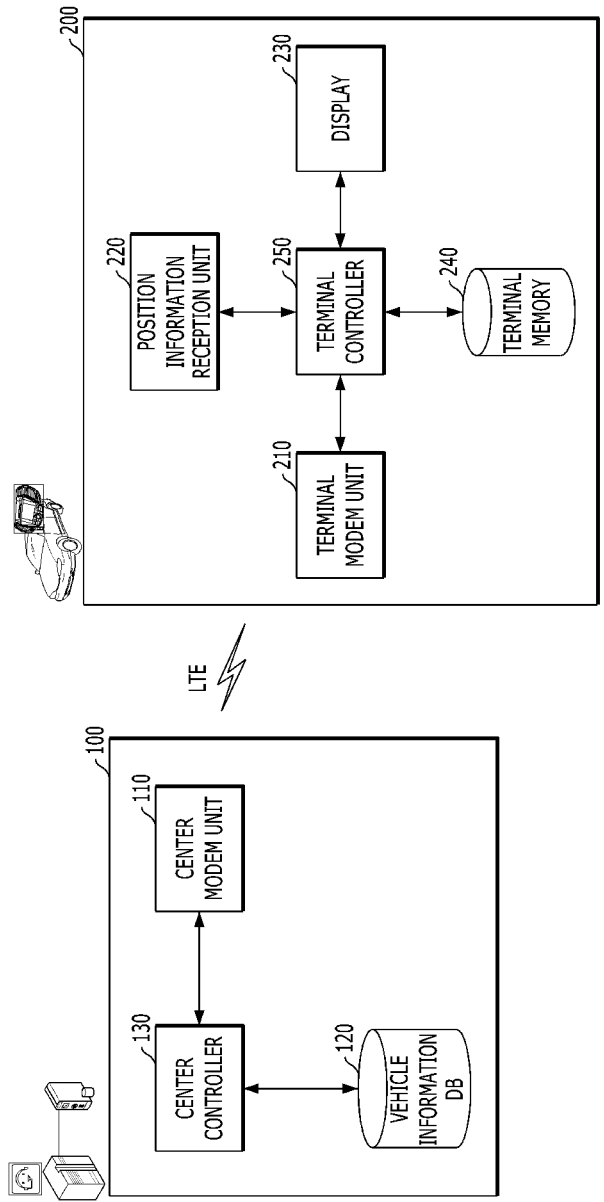
FIG. 2 is a block diagram illustrating a telematics center and a telematics terminal in accordance with one embodiment of the present invention.

FIG. 2 is a block diagram illustrating a telematics center 100 and a telematics terminal 200 in accordance with one embodiment of the present invention.

The telematics center 100 may include a center modem unit 110, a vehicle information database (DB) 120, and a center controller 130. The telematics center 100 may include elements provided in number greater than these elements, but only the elements necessary for description of the present invention are displayed.

The center modem unit 110 may communicate with a terminal modem unit 210 of the telematics terminal 200. The center modem unit 110 may communicate with other mobile terminals.

The vehicle information DB 120 may serve as big data under control of the center controller 130. The vehicle information DB 120 may store basic information of a vehicle, such as a periodic driving log (a log during periodic inspection), a controller learning value (for example, CAN communication signal reception), failure diagnosis service data (data during vehicle failure), and a normal driving log (driving velocity, distance and the like).

The vehicle information DB 120 may store information of a modem. The vehicle information DB 120 may store information, such as a remote service usage frequency, battery capacity/performance information, a weak electric field area visit frequency, a weak electric field area visit time, and a parking time, and mobile communication information according to areas (Rx, Tx, RSCP, EcOo, CQI and the like).

Further, the vehicle information DB 120 may store information for remote control. Further, if the vehicle information DB 120 communicates with the telematics center 100 through a mobile terminal, the vehicle information DB 120 may store ID and password information used to authenticate user's access to the telematics center 100.

Further, the vehicle information DB 120 may store vehicle management information (temperature, a remaining battery capacity and the like) and driver/vehicle information (vehicle kind and production year information).

The center controller 130 may control the overall operation of the telematics center 100. A detailed description of the center controller 130 will be given later.

The telematics terminal 200 may include the terminal modem unit 210, a terminal position information reception unit 220, a display 230, a terminal memory 240, and a terminal controller 250.

Although the disclosure describes the telematics terminal 200 as including the terminal modem unit 210 and the terminal position information reception unit 220, the terminal 200 may be implemented as including a unit 210 and a terminal position information reception unit 220 provided separately from a telematics unit (not shown) including a modem and thus communicate with the telematics unit (not show) through in-vehicle communication, such as a Controller Area Network (CAN). The telematics terminal 200 described in the disclosure may include elements provided in number greater than or less than these elements.

The telematics terminal 200 generally includes the display 230 disposed on the front portion inside the vehicle. Further, the telematics terminal 200 provides audio, video, and navigation functions.

The terminal modem unit 210 may include one or more modules enabling wireless communication between the telematics terminal 200 and a wireless communication system, between the telematics terminal 200 and another telematics terminal, or between the telematics terminal 200 and an external center. Further, the terminal modem unit 210 may include one or more modules connecting the telematics terminal 200 to one or more networks. Although the disclosure describes the terminal modem unit 210 and the position information reception unit 220 as being separated from each other, the telematics terminal 200 may be implemented such that a telematics unit (not shown) includes the terminal modem unit 210 and the position information reception unit 220.

The terminal modem unit 210 may communicate with the telematics center 100. In general, the terminal modem unit 210 may communicate with the telematics center 100 using wireless communication. The terminal modem unit 210 may transmit and receive a wireless signal to and from at least one of a base station, an external terminal, and a center on a mobile communication network constructed according to technical standards or communication schemes for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A) and the like). The wireless signal may include a voice call signal, a video call signal or various types of data according to text/multimedia message transmission and reception.

The position information reception unit 220 serves to acquire the position (or the current position) of the telematics terminal 200. For example, the position of the telematics terminal 200 may be acquired using a signal transmitted from a GPS satellite through the position information reception unit 220.

Further, the telematics terminal 200 may support Wi-Fi, Bluetooth, Wi-Fi direct and the like.

The display 230 may include at least one of a liquid crystal display (LCD), a thin film transistor-liquid crystal display (TFT LCD), an organic light emitting diode (OLED), a flexible display, a 3D display, and an e-ink display.

Further, two or more displays 230 may be provided according to implementation types of the telematics terminal 200. In this case, a plurality of displays 230 may be separated from each other or formed integrally on one surface of the mobile terminal, or be disposed on different surfaces of the mobile terminal.

The display 230 may include a touch sensor to sense touch on the display 230 so as to receive a control command input through touch. Using such a method, when touch on the display 230 occurs, the touch sensor may sense the touch and the terminal controller 250 may generate a control command corresponding to the touch. Contents input through touch may include text, numbers, or menu items which may be indicated or designated in various modes.

The terminal memory 240 stores data to support various functions of the telematics terminal 200. The terminal memory 240 may store a plurality of application programs or applications executed in the telematics terminal 200 and data and commands to operate the telematics terminal 200. At least some of these application programs may be downloaded from an external center through wireless communication. Further, at least some of these application programs may be preinstalled in the telematics terminal 200 so as to execute basic functions of the telematics terminal 200. The application programs may be stored in the terminal memory 240, installed in the telematics terminal 200, and driven by the terminal controller 250 so as to perform the operation (or function) of the telematics terminal 200.

The terminal memory 240 may store programs to operate the terminal controller 250 and temporarily store pieces of input/output data. The terminal memory 240 may store data regarding various patterns of vibration and sound which are output, under control from the terminal controller 250, when touch on a touchscreen is input.

The terminal memory 240 may include at least one storage medium of a flash memory type storage unit, a hard disk type storage unit, a solid state disk (SSD) type storage unit, a silicon disk drive (SDD) type storage unit, a multimedia card micro type storage unit, a card type storage unit (for example, an SD or XD storage unit), a random access memory (RAM), a static random access memory (SRAM), a read-only memory (ROM), an electrically erasable programmable read-only memory (EEPROM), a programmable read-only memory (PROM), a magnetic storage unit, a magnetic disk, and an optical disc. The telematics terminal 200 may be operated in relation with a web storage performing the storage function of the terminal memory 240 over the Internet.

The terminal controller 250 controls the overall operation of the telematics terminal 200 in addition to operations regarding the application programs. The terminal controller 250 may process signals, data, or information, input or output through the above-described elements, or execute the application programs stored in the terminal memory 240, thus processing or providing proper information or functions to a user.

The terminal controller 250 may receive current position information of the telematics terminal 200 through the terminal position information reception unit 220. The current position information may be received through GPS reception.

In addition, the telematics terminal 200 may include an audio module (not shown) and provide audio through the audio module (not shown).

Figure 3:
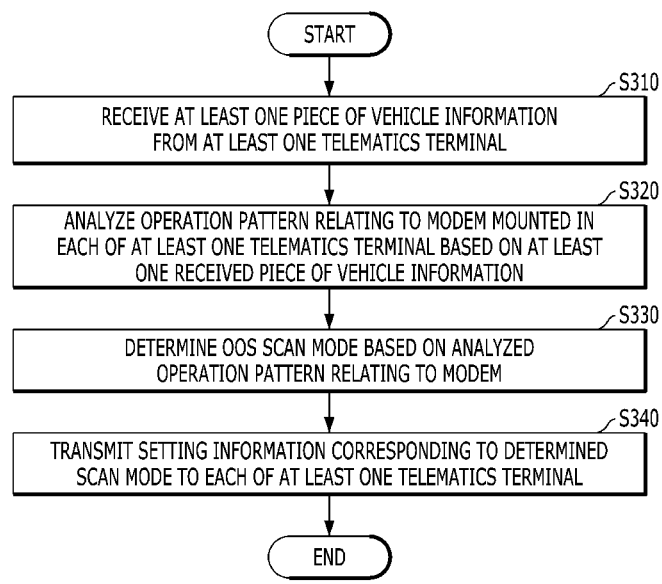
FIG. 3 is a sequence diagram illustrating a control method of a telematics center in accordance with one embodiment of the present invention.

FIG. 3 is a sequence diagram illustrating a control method of a telematics center in accordance with one embodiment of the present invention. Here, the reference numerals of FIG. 2 are used.

First, the center controller 130 receives at least one piece of vehicle information from at least one telematics terminal 200 through the center modem unit 110 (Operation S310).

The center controller 130 may receive the at least one piece of vehicle information from the at least one telematics terminal 200 and store the at least one received piece of vehicle information in the vehicle information DB 120. The vehicle information DB 120 may correspond to big data.

The center controller 130 may receive at least one of a telematics remote service usage frequency, vehicle battery information, a weak electric field area visit frequency, a weak electric field area visit time and a parking time from one telematics terminal 200. Further, the center controller 130 may receive basic vehicle information. For example, the center controller 130 may store driving information (the position, velocity, and the like of a vehicle), vehicle management information (the temperature of the vehicle), driver information, vehicle information (a vehicle kind and a vehicle production year), and safety security information (failure history information) in the vehicle information DB 120.

The center controller 130 may receive vehicle information from applications for the telematics service loaded in the telematics terminal 200. For example, these applications may include a blue link, an EVO and the like.

Thereafter, the center controller 130 analyzes an operation patterns relating to modems mounted in the respective telematics terminals 200 based on the received vehicle information (Operation S320).

The center controller 130 may analyze operations relating to the modems mounted in the respective telematics terminals 200 by analyzing data of the vehicle information DB 120.

Although the disclosure describes the center controller 130 as analyzing the operation patterns of the modems of the respective telematics terminals 200 based on the information stored in the vehicle information DB 120, this is only one embodiment and a controller (not shown) of the vehicle information DB 120 may analyze the operation patterns of the modems of the respective telematics terminals 200 by analyzing the information stored in the vehicle information DB 120 and then provide the analyzed operation patterns to the center controller 130.

Further, the center controller 130 may classify the operation patterns into at least one category based on the received vehicle information. The center controller 130 may receive information from the respective telematics terminals 200 and classify the operation patterns of the modems into designated groups. A detailed description thereof will be given later.

Thereafter, the center controller 130 determines out of service (OOS) scan modes based on the analyzed operation patterns relating to the modems (Operation S330).

An OOS scan is an operation performed by the telematics terminal 200. The center controller 130 may control the modem unit 110 in a normal mode or a sleep mode. The normal mode means a mode in which, if the engine of a vehicle is driven, the modem unit 110 is normally operated, and the sleep mode means a mode in which, even if the engine of the vehicle is stopped, the modem unit 110 is operated at low power. In order to prevent electrical discharge of a battery due to current consumption of the modem unit 110, the telematics terminal 200 may operate the modem unit 110 in the sleep mode only for a predetermined period, for example, 96 hours, and then turn the modem unit 110 off, if the engine is not turned on in the predetermined period.

The telematics center 100 may adjust a modem scan time and frequency of the telematics terminal 200, if there is an agreement of a user of the telematics terminal 200.

Hereby, the center controller 130 may determine the OOS scan periods and frequencies of the telematics terminals 200 based on the analyzed operation patterns relating to the modems. Since the center controller 130 may most easily use the vehicle information DB 120, a terminal of the telematics center 100 may perform such analysis.

The center controller 130 may classify the operation patterns relating to the modems into at least one category based on the received vehicle information and set different scan modes of the respective telematics terminals 200 according to categories.

Further, the center controller 130 may determine the OOS scan modes of the telematics terminals 200 in the normal mode or the sleep mode.

One example will be described in more detail. The center controller 130 may receive information below from a telematics terminal mounted in one vehicle. The center controller 130 may receive information, that the average parking time is within 1 hour except for midnight, the main parking area is a weak electric field area or a no service area (telematics service disallowable area) in an underground parking lot in addition to a general above-ground parking lot, and the corresponding vehicle has a remote service failure rate of 10% or more due to parking in a weak electric field underground parking lot, from the corresponding telematics terminal.

In this case, since the above telematics terminal frequently uses the telematics service, the center controller 130 may control the telematics terminal so that the telematics terminal more frequently performs OOS scan for a long time when the telematics terminal is operated in the normal mode or operated in the sleep mode. Thereby, the center controller 130 may change a modem set value of the corresponding telematics terminal so that the telematics terminal more frequently performs OOS scan for a long time. Thus, the telematics terminal may perform a user-customized OOS scan and thus, user convenience and apparatus efficiency may be improved.

As another example, the center controller 130 may received information, that the average parking time is 3-4 days, the main parking area is a general above-ground parking lot, and the corresponding vehicle has a low telematics service usage frequency and a remote service success rate of 95%, from the corresponding telematics terminal.

In this case, the controller 130 may control the telematics terminal so that a modem set value is not changed if the modem of the telematics terminal is operated in the normal mode and an OOS can frequency is decreased and a scan period is increased if the modem of the telematics terminal is operated in the sleep mode. Thereby, the telematics terminal may reduce a current consumption amount due to the OOS scan to prevent electrical discharge of a battery and perform an OOS scan operation most suitable for the telematics terminal.

Although the disclosure describes only the OOS scan, collection of big data from at least one vehicle telematics terminal and provision of a user-customized service using the collected big data may be applied to various cases.

Further, the center controller 130 may classify telematics terminals into a plurality of categories based on received vehicle information. For example, if telematics terminals are in the normal mode, the center controller 130 may classify the telematics terminals into a group requiring more frequent OOS scan and a groups not requiring more frequent OOS scan and, if telematics terminals in the sleep mode, the center controller 130 may classify the telematics terminals into a group requiring more frequent OOS scan and a groups not requiring more frequent OOS scan.

Here, the center controller 130 may give priorities and grades to vehicle information and classify telematics terminals. For example, the center controller 130 may allot different grades to a telematics remote service usage frequency, vehicle battery information, a weak electric field area visit frequency, a weak electric field area visit time and a parking time, and calculate scores of the telematics terminals using the total sums and the means of the grades.

Thereafter, the center controller 130 transmits setting information corresponding to determined scan modes to the respective telematics terminals (Operation S340).

The center controller 130 may transmit the setting information to the respective telematics terminals through an SMS or a web.

Further, the center controller 130 may change the setting information of the telematics terminals 200 using Firmware Over The Air (FOTA). For example, the center controller 130 may control the telematics terminals 200 so as to change NV items.

Prior to change of the setting information of the telematics terminals 200, the center controller 130 may receive agreements from the telematics terminals 200.

Figure 4:
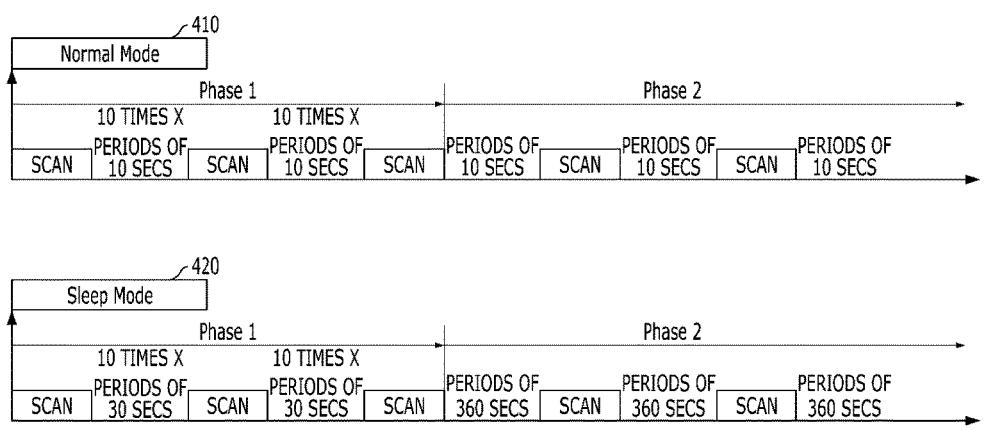
FIG. 4 is a view illustrating OOS scan operations of a telematics terminal in a normal mode and a sleep mode in accordance with one embodiment of the present invention.

FIG. 4 is a view illustrating OOS scan operations of a telematics terminal in the normal mode and the sleep mode in accordance with one embodiment of the present invention.

With reference to FIG. 4, if the telematics terminal 200 is operated in the normal mode 410, the telematics terminal 200 may perform 2 cycles of the OOS scan times at periods of 10 seconds in a phase 1 and continuously perform the OOS scan at periods of 10 seconds in a phase 2.

Further, if the telematics terminal 200 is operated in the sleep mode 420, the telematics terminal 200 may perform 2 cycles of the OOS scan 10 times at periods of 30 seconds in a phase 1 and continuously perform the OOS scan at periods of 360 seconds in a phase 2.

The center controller 130 may set scan periods, frequencies and cycles in a user-customized type.

Figure 5:
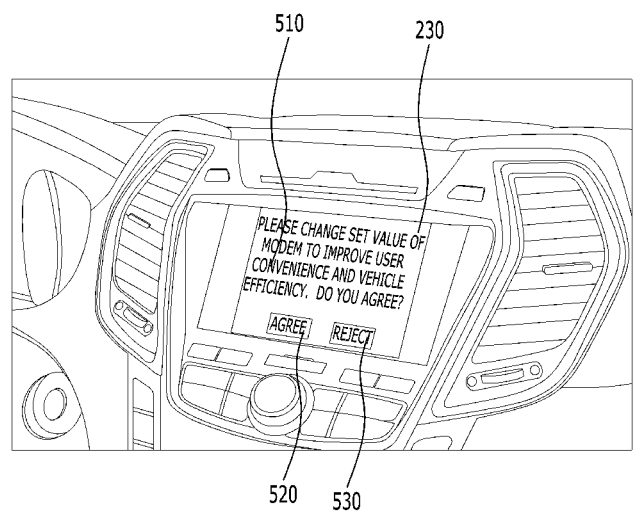
FIG. 5 is a view illustrating a UI to receive a user agreement for change of an OOS scan set value in accordance with one embodiment of the present invention.

FIG. 5 is a view illustrating a user interface (UI) to receive a user agreement for change of an OGS scan set value in accordance with one embodiment of the present invention.

With reference to FIG. 5, the telematics terminal 200 may display a question shown in FIG. 5 to a user through the display 230 and, if a message indicating a user agreement is received from the user, the center controller 130 may change a corresponding set value.

The above-described present invention may be implemented by computer readable code stored in a medium in which programs are recorded. Computer readable media include all kinds of recording devices in which data readable by a computer system is stored. For example, computer readable media include a hard disk drive (HDD), a solid state disk (SSD), a silicon disk drive (SDD), a ROM, a RAM, a CD-ROM, a magnetic tape, a floppy disk, an optical data storage device and the like. Computer readable media may be implemented in a carrier wave type (for example, transmission over the Internet). Further, a computer may include a controller of a terminal.

As apparent from the above description, in a telematics center and a control method thereof in accordance with one embodiment of the present invention, vehicle information is collected from a plurality of telematics terminals and the OOS scan mode of each of the telematics terminals is changed into a user-customized type and thus, user convenience may be improved.

Further, a modem of the telematics terminal is effectively used so that electrical discharge of a vehicle battery may be prevented and thus, apparatus efficiency may be improved.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A control method of a telematics center, comprising:
    receiving vehicle information from at least one telematics terminal;
    analyzing an operation pattern of a modem mounted in each of the at least one telematics terminal based on the vehicle information;
    determining an Out Of Service (OOS) scan mode based on the analyzed operation pattern of the modem; and
    transmitting telematics terminal setting information corresponding to the determined scan mode to each of the at least one telematics terminal,
    wherein the vehicle information includes a telematics remote service usage frequency, a vehicle battery information, a weak electric field area visit frequency, a weak electric field area visit time and a parking time of each of the at least one telematics terminal.

2. The method according to claim 1, wherein, in the reception of the vehicle information, the vehicle information is received through an application for telematics service provided in the at least one telematics terminal.

3. The method according to claim 1, wherein, in the analysis of the operation pattern of the modem mounted in each of the at least one telematics terminal, the operation pattern of the modem is analyzed using big data stored in a terminal of the telematics center.

4. The method according to claim 1, wherein the analysis of the operation pattern of the modem mounted in each of the at least one telematics terminal includes classifying the operation pattern of the modem into at least one category based on the received vehicle information.

5. The method according to claim 4, wherein, in the determination of the OOS scan mode, different scan modes are determined according to the at least one category.

6. The method according to claim 1, wherein, in the determination of the OOS scan mode, the period of an OOS scan is determined based on the analyzed operation pattern of the modem.

7. The method according to claim 1, wherein, in the determination of the OOS scan mode, the frequency of an OOS scan is determined based on the analyzed operation pattern of the modem.

8. The method according to claim 1, wherein, in the determination of the OOS scan mode, the OOS scan mode of the at least one telematics terminal in a normal mode is determined.

9. The method according to claim 1, wherein, in the determination of the OOS scan mode, the OOS scan mode of the at least one telematics terminal in a sleep mode is determined.

10. The method according to claim 1, wherein, in the transmission of the setting information to each of the at least one telematics terminal, the setting information is transmitted to each of the at least one telematics terminal through an SMS or a web.

11. The method according to claim 1, wherein, in the transmission of the setting information to each of the at least one telematics terminal, the setting information is transmitted to each the at least one telematics terminal using Firmware On the Air (FOTA).

12. The method according to claim 1, further comprising receiving permission to change setting information of the at least one telematics terminal into the setting information corresponding to the determined scan mode from the at least one telematics terminal.

* * * * *